(No Model.)

J. T. TONKS.
SNAP SHUTTER FOR PHOTOGRAPHIC CAMERAS.

No. 386,857. Patented July 31, 1888.

Witnesses.
Geo. Wadman.
M. J. Roach.

Inventor.
James T. Tonks
by his attys.
Gifford & Browne.

United States Patent Office.

JAMES T. TONKS, OF WATERBURY, CONNECTICUT, ASSIGNOR TO THE SCOVILL MANUFACTURING COMPANY, OF NEW YORK, N. Y.

SNAP-SHUTTER FOR PHOTOGRAPHIC CAMERAS.

SPECIFICATION forming part of Letters Patent No. 386,857, dated July 31, 1888.

Application filed March 28, 1887. Serial No. 232,695. (No model.)

*To all whom it may concern:*

Be it known that I, JAMES THOMAS TONKS, of Waterbury, in the county of New Haven and State of Connecticut, have invented a certain new and useful Improvement in Shutters for Photographic Cameras, of which the following is a specification.

My improvement relates to photographic cameras in which a shutter is employed for effecting the exposure.

I will describe in detail a shutter embodying my improvement, and then point out the novel features in the claims.

Figure 1:
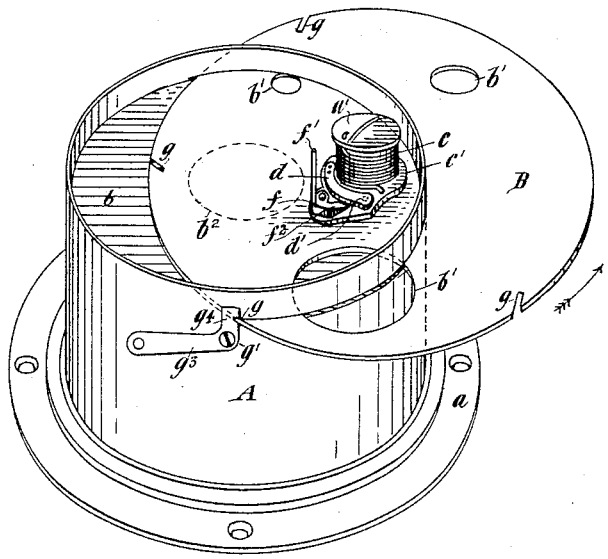
Figure 2:
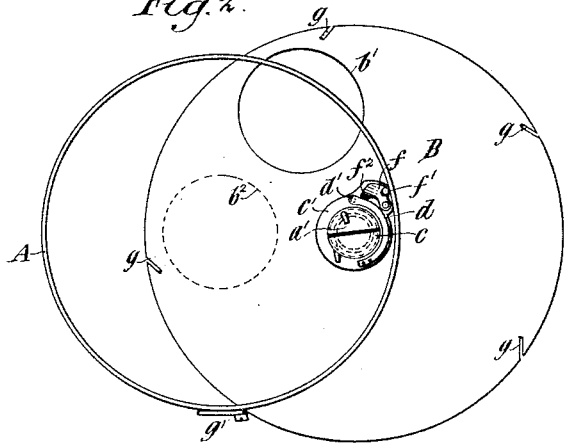
Figure 3:
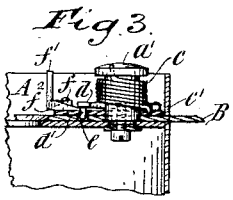

In the accompanying drawings, Figure 1 is a perspective view of a lens-tube employed in a photographic camera and having my improved shutter arranged thereon. Fig. 2 is a plan view showing certain parts in a different position from that in which they are shown in Fig. 1. Fig. 3 is a detail view in perspective, on an enlarged scale from Fig. 2, showing certain features of the improvement.

Similar letters of reference designate corresponding parts in all the figures.

A designates a camera lens-tube. It may be of the usual or any desirable construction and is provided at its rear end, as shown, with a flange, $a$, by which it may be conveniently secured to the box or case of the camera or other suitable support.

B designates a shutter for the lens-tube, which, as shown, is mounted centrally upon a post or stud, $a'$, (here shown as a screw secured in a plate, $b$,) arranged in the lens-tube just within the outer mouth of the same and constituting a partition. This pin or stud $a'$ is arranged eccentric to the axis of said partition, so that when the shutter is rotated thereon apertures $b'$, formed in the shutter, may be brought opposite an opening, $b^2$, in the partition $b$. I have shown the aperture in the partition in dotted outline in Figs. 1 and 2. The shutter is arranged close to the partition $b$ and rotates through a suitably-formed slot in the lens-tube.

The shutter B may be used as a snap-shutter, or otherwise, as desired. For using it as a snap-shutter, I have shown means consisting in a spring, $c$, coiled about the post or stud $a'$, and secured at one end to the upper portion of said post or stud and at the lower end to a plate, $c'$, through an aperture in which the post or stud extends loosely, so that the plate may be moved freely about said post or stud. Upon the plate $c'$, I have shown secured near one end a spring, $d$. This spring extends circumferentially about the post or stud $a'$, as shown, for about one-half the circumference of said post or stud. Near its other end it bears a pin or projection, $d'$, which pin or projection extends downwardly through a hole formed in the plate $c'$. The tendency of the spring $d$ is to force said pin downwardly through said hole.

In the shutter B there is formed a hole, $e$, in such position that it may be brought beneath the inner end of the pin $d'$ on the spring $d$. When brought into such position, the pin $d'$ will be forced into the hole $e$ by the spring $d$, and the shutter and the plate $c'$ will be locked together. When thus locked together, if the shutter be rotated, as shown, in the direction of the arrow, Fig. 1, the spring will be coiled more tightly about the post or stud $a'$, and if the force tending to rotate the shutter in such direction be removed the tendency of the spring is to rotate it rapidly in the opposite direction, thus causing one of the apertures therein to be thrown quickly past the aperture in the partition $b$, whereby the shutter operates as a snap-shutter. If, on the other hand, it is not desired to use the shutter as a snap-shutter, the pin $d'$ is lifted out of engagement with the hole $e$ in the snap-shutter and the shutter may then be rotated freely by hand in either direction, and will be maintained by friction in any position into which it may be adjusted. I have shown means for lifting the pin $d'$ out of engagement with the hole $e$, consisting in a lever, $f$, (here shown as a bell-crank lever,) fulcrumed upon the plate $c'$ outside of the spring $d$. One arm of this bell-crank lever is provided with an upwardly-projecting portion, $f'$, which may be operated by the finger of an operator to rock the bell-crank lever on its fulcrum. The other arm of said lever is provided with a beveled tooth or projection, $f^2$, which may be forced beneath the spring $d$, so as to elevate the same, and consequently move the pin $d'$ out of engagement with the hole $e$.

It is of course to be understood that when the pin $d'$ is in engagement with the hole $e$ the tooth or projection on the bell-crank lever is out from under the spring $d$.

When it is intended to use the shutter as a snap-shutter, it is desirable to maintain the shutter in a position suitable for effecting an exposure until such time as the exposure is desired. For this purpose I have shown slots $g$, formed in the periphery of the shutter, and a bell-crank lever, $g'$, fulcrumed upon the side of the lens-tube adjacent to the shutter. One arm, $g^3$, of this lever may be grasped by hand to move the other arm, $g^4$, into or out of engagement with one of said slots. When in engagement with the slot, as shown more clearly in Fig. 1, the shutter is maintained in the desired position previous to exposure. When moved out of engagement therewith, the shutter is thrown by the action of the spring $c$ into the position shown in Fig. 2. When in this latter position the projection $f'$ on the bell-crank lever is brought into contact with the inner surface of the lens-tube, and therefore operates as a stop to prevent a too extended rotation of the shutter.

I do not herein intend to limit myself to the particular means shown and described for transforming the shutter from a snap-shutter to one which does not operate as a snap-shutter, as obviously other means may be employed for effecting this object which would be within the spirit of my invention.

I claim—

1. The combination, with a camera lens-tube provided with a transverse partition having an aperture therein, of a revolving shutter adjacent to said partition and provided with an opening or openings adapted to be brought opposite the opening in said partition, a post or stud secured in said partition about which said shutter rotates, said post or stud being eccentric to the axis of the lens-tube, a spring coiled about said post or stud for effecting the rotation of the shutter, and means, substantially such as described, whereby the shutter may be relieved from the action of said spring, substantially as specified.

2. The combination, with a camera lens-tube provided with a transverse partition having an aperture therein, of a revolving shutter adjacent to said partition and provided with an opening or openings adapted to be brought opposite the opening in said partition, a post or stud about which said shutter rotates, said post or stud being eccentric to the axis of the lens-tube, a spring coiled about said post or stud and secured at one end to the post or stud, a plate loosely surrounding said post or stud to which the other end of said spring is secured, a spring secured near one of its ends to said plate and near its other end bearing a pin or projection which extends through a hole in said plate, and a lever having a portion adapted to be moved beneath said last-mentioned spring to elevate the same and the pin, or to be moved out from under the same to allow the spring and pin to descend in order to engage the latter with a hole in the shutter, substantially as specified.

JAS. T. TONKS.

Witnesses:
C. W. DE MOTT,
T. R. HYDE, Jr.